United States Patent
Farr et al.

(10) Patent No.: US 7,492,761 B1
(45) Date of Patent: Feb. 17, 2009

(54) BROADBAND LOOP CARRIER SYSTEM

(75) Inventors: Lisa Farr, Santa Barbara, CA (US); Mark Rumer, Santa Barbara, CA (US)

(73) Assignee: Occam Networks, Santa Barbara, CA (US)

( * ) Notice: Subject to any disclaimer, the term of this patent is extended or adjusted under 35 U.S.C. 154(b) by 1028 days.

(21) Appl. No.: 10/109,794

(22) Filed: Mar. 29, 2002

(51) Int. Cl.
*H04L 12/28* (2006.01)
(52) U.S. Cl. ..................... 370/389; 370/392
(58) Field of Classification Search ......... 370/351–360, 370/389, 391, 392, 400–402, 419–421; 709/203, 709/217–219, 230, 236
See application file for complete search history.

(56) References Cited

U.S. PATENT DOCUMENTS

| | | | |
|---|---|---|---|
| 5,355,362 A | 10/1994 | Gorshe et al. | |
| 5,610,910 A * | 3/1997 | Focsaneanu et al. | 370/351 |
| 6,424,657 B1 * | 7/2002 | Voit et al. | 370/412 |
| 6,640,239 B1 * | 10/2003 | Gidwani | 709/243 |
| 6,880,002 B2 * | 4/2005 | Hirschfeld et al. | 709/223 |
| 6,941,364 B2 * | 9/2005 | Kim et al. | 709/223 |
| 6,944,191 B2 * | 9/2005 | Hou et al. | 370/535 |
| 6,954,454 B1 * | 10/2005 | Schuster et al. | 370/352 |
| 6,963,561 B1 * | 11/2005 | Lahat | 370/356 |
| 7,142,560 B2 * | 11/2006 | Mansfield | 370/466 |
| 7,233,587 B2 * | 6/2007 | Pattavina et al. | 370/345 |
| 7,257,113 B2 * | 8/2007 | O'Connor | 370/353 |

OTHER PUBLICATIONS

"The 7 Layers of the OSI Model," Webopedia, http://webopedia.internet.com/quick_ref/OSI_Layers.html, 2 pages, downloaded Mar. 11, 2002.

"Occam Networks Technical Symposium, A Brief History of Loop Carrier Technologies," Occam Networks, One Network, No. Limits, Jun. 13, 2001, 7 pages.

American National Standard, T1.119.02-1998 (R2004) "Synchronous Optical Network (SONET)—Operations, Administration, Maintenance, & Provisioning (OAM&P) Communications—Performance Management Fragment", ATIS, Approved Apr. 23, 1998, (Cover & title pages, and pp. i-vi & 1-42).

American National Standard, T1.105.04-199 (R2001) "Synchronous Optical Network (SONET)—Data Communication Channel Protocols and Architectures", ATIS, Approved Dec. 13, 1995, (Cover & title pages, and pp. i-ix & 1-15).

"Copper Mountain Announces IP IQ - An Intelligent Approach to DSL Access Networks," http://findarticles.com/p/articles/mi_m0EIN/is_APril_17/ai_61520199/print?tag=art . . ., 4 pgs., (Apr. 17, 2000).

"IP Service Intelligence at the Edge: Enabling Value-Added Services Over DSL," Copper Mountain Networks, Inc. and Spring Tide Networks, Inc., 18 pgs. (Apr. 2000).

Rolf McClennan and Jim Metzler, "Designing the new MAN," http://www.networkworld.com/research/2001/1105feat.html, 5 pgs. (Nov. 5, 2001).

Nico Wauters, et al., "Survivability in a New Pan-European Carriers' Carrier Network Based on WDM and SDH Technology: Current Implementation and Future Requirements," IEEE Communications Magazine, pp. 63-69 (Aug. 1999).

* cited by examiner

*Primary Examiner*—Wing F. Chan
*Assistant Examiner*—Mark A. Mais
(74) *Attorney, Agent, or Firm*—Blakely, Sokoloff, Taylor & Zafman LLP

(57) ABSTRACT

A method and apparatus for receiving data from a network subscriber, wherein the data conforms to multiple protocols, converting the data into packets that conform to a single protocol of a single layer of the Open System Interconnection Model, and propagating the packets across a network.

22 Claims, 3 Drawing Sheets

BROADBAND LOOP CARRIER SYSTEM

FIELD OF THE INVENTION

This invention relates generally to loop carriers, and more particularly to a loop carrier that provides broadband service to remote subscribers.

BACKGROUND

As the need for high speed communication increases, new techniques and networks are required to improve the efficiency with which data can be transmitted. Several Digital Loop Carrier ("DLC") systems have been introduced over the last few decades to address the need for high speed communication. A DLC is a telecommunications system that carries telephone signals from a Central Office to subscribers in a local loop using digital signals as a transport mechanism. The first DLC was introduced in the early 1970's to provide a cost-effective means for deployment of voice service in rural areas.

The local loop is necessary since Central Office equipment has an operational range limitation of 18,000 feet. This range is called the Central Office serving area. Subscribers living within that service area are the only subscribers who receive service directly from the Central Office. All other customers receive service from the DLC via Remote Terminals coupled to the local loop.

The Remote Terminals serve as service aggregation points for remote subscribers and are located along the local loop, which is often comprised of fiber optic cable. In operation, voice traffic bound for a subscriber is digitized and transported over the fiber optic cable to a Remote Terminal that services the target subscriber. Upon receipt of the digitized voice traffic, the Remote Terminal converts the digitized signal into an analog signal that is carried to the target subscriber's telephone via a twisted pair of copper wires. In this manner, telephone service is provided to remote subscribers.

In addition, T1 connections are used to deliver phone service to large entities such as corporations, hospitals, hotels, or universities having a large number of telephone lines that are interconnected yet require connection to the local loop.

This entire DLC implementation utilizes Time Division Multiplexing ("TDM") elements. TDM refers to a technique in which data from multiple channels may be allocated bandwidth on a single medium (e.g., copper wire) based on a time slot assignment.

A more recent version of the DLC provides Asymmetrical Digital Subscriber Line ("ADSL") service along with telephone service to a remote subscriber. This is made possible by transmitting signals for the telephone service and Digital Subscriber Line ("DSL") service on the same line to a splitter within the Remote Terminal. The splitter is included to separate the frequencies for telephone service and DSL service. The voice traffic is sent back to the Central Office via the TDM infrastructure while the DSL service is sent back to the Central Office via a separate Asynchronous Transfer Mode ("ATM") overlay network. In this system, the ATM traffic has limited access to the available bandwidth since at least a portion of the bandwidth has been previously dedicated to telephone service regardless of whether the dedicated bandwidth is actually being used at the time of ATM transmission.

In yet a later DLC, a Symmetrical High Bit Rate Digital Subscriber Line ("SHDSL") is used to connect an Integrated Access Device ("IAD") to a Digital Subscriber Line Access Multiplexer ("DSLAM") located in the Remote Terminal. An IAD is customer premise equipment used for aggregating diverse traffic types such as voice and data. The IAD converts analog voice traffic to digital and sends the digitized voice traffic along with non-voice data. The ATM overlay in this system also shares bandwidth with the existing TDM infrastructure, which contains dedicated bandwidth that cannot be reallocated based on network traffic requirements.

All of the DLCs described above conform to the American National Standards Institute's ANSI T1.105-1995 et seq. and ANSI T1.119-1994 et seq. standards for a Synchronous Optical Network ("SONET"), which is a standard for synchronous data transmission on optical media. Typically, SONET is used in a fiber ring topology and supports electronic redundancy in the form of protection switching from a primary to a standby path when a network fault occurs. One problem with a SONET-based communication system is that SONET uses circuit switching with virtual circuits, which ties up bandwidth that cannot be reallocated based on network traffic requirements.

SUMMARY

A method and apparatus are disclosed for receiving data from a network subscriber, wherein the data conforms to multiple protocols, converting the data into packets that conform to a single protocol of a single layer of the Open System Interconnection Model, and propagating the packets across a network. In various embodiments, the single layer is Layer 3 of the Open System Interconnection Model, and the single protocol is the Internet Protocol.

DESCRIPTION OF THE DRAWINGS

Various embodiments are illustrated by way of example and not by way of limitation in the figures of the accompanying drawings in which like references indicate similar elements. References to "an," "one," or "various" embodiments in this disclosure are not necessarily to the same embodiment, and such references mean at least one.

DETAILED DESCRIPTION

In the following description, for the purposes of explanation, numerous specific details are set forth in order to provide a thorough understanding of the various embodiments. It will be apparent, however, to one skilled in the art, that the various embodiments may be practiced without some of these specific details. In other instances, well known structures and devices are omitted or simplified in order to avoid obscuring the details of the various embodiments.

The following description and the accompanying drawings provide examples for the purpose of illustration. However, these examples should not be construed in a limiting sense as they are not intended to provide an exhaustive list of all possible implementations. For example, various signals, layout patterns, and logical circuits may be modified according to the teachings of the various embodiments.

Figure 1:
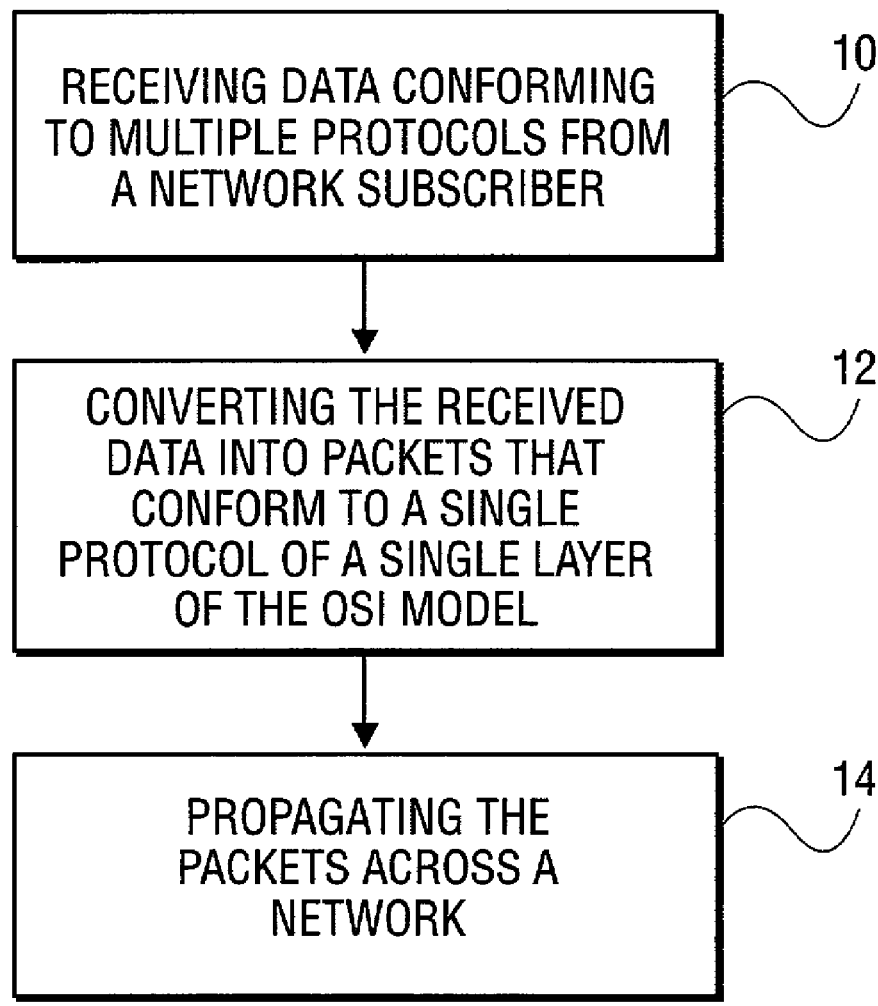
FIG. 1 is a flow chart showing one method of converting data that conforms to multiple protocols into packets that conform to a single protocol and propagating the packets over a network.

Referring to FIG. 1, a flow chart is shown that illustrates a method according to one embodiment. At block 10, data conforming to multiple protocols is received from a network subscriber. As used herein, data refers to both voice data and non-voice data. The received data is converted into packets that conform to a single protocol of a single layer of the International Organization for Standardization's Open System Interconnection ("OSI") Model at block 12. In various embodiments, the single layer of the OSI Model to which the packets conform is Layer 3. The packets are then propagated over a network at block 14.

Layer 3 of the OSI Model corresponds to the Network Layer, which provides switching, routing, forwarding, addressing, internetworking, error handling, and congestion control. Although various embodiments discussed herein characterize the "single layer" as Layer 3, the "single layer" could be any other layer of the OSI Model so long as only a single layer is used.

Various embodiments use Internet Protocol ("IP") as the single Layer 3 protocol to which the packets conform. IP advantageously provides for reallocation of bandwidth as system requirements (e.g, network traffic) vary, as opposed to circuit-switched technologies such as SONET and ATM that typically prevent reallocation of network resources that are already dedicated to a particular subscriber or service. In addition, IP packets provide a uniform transport method for both voice data and non-voice data using a single transport infrastructure, as opposed to existing DLCs that require a TDM infrastructure as well as an ATM overlay.

Although not shown in FIG. 1, packet 2 transmission over a network may be prioritized based on packet type. For instance, voice data packets could be given priority over non-voice data packets, or vice versa.

Figure 2:
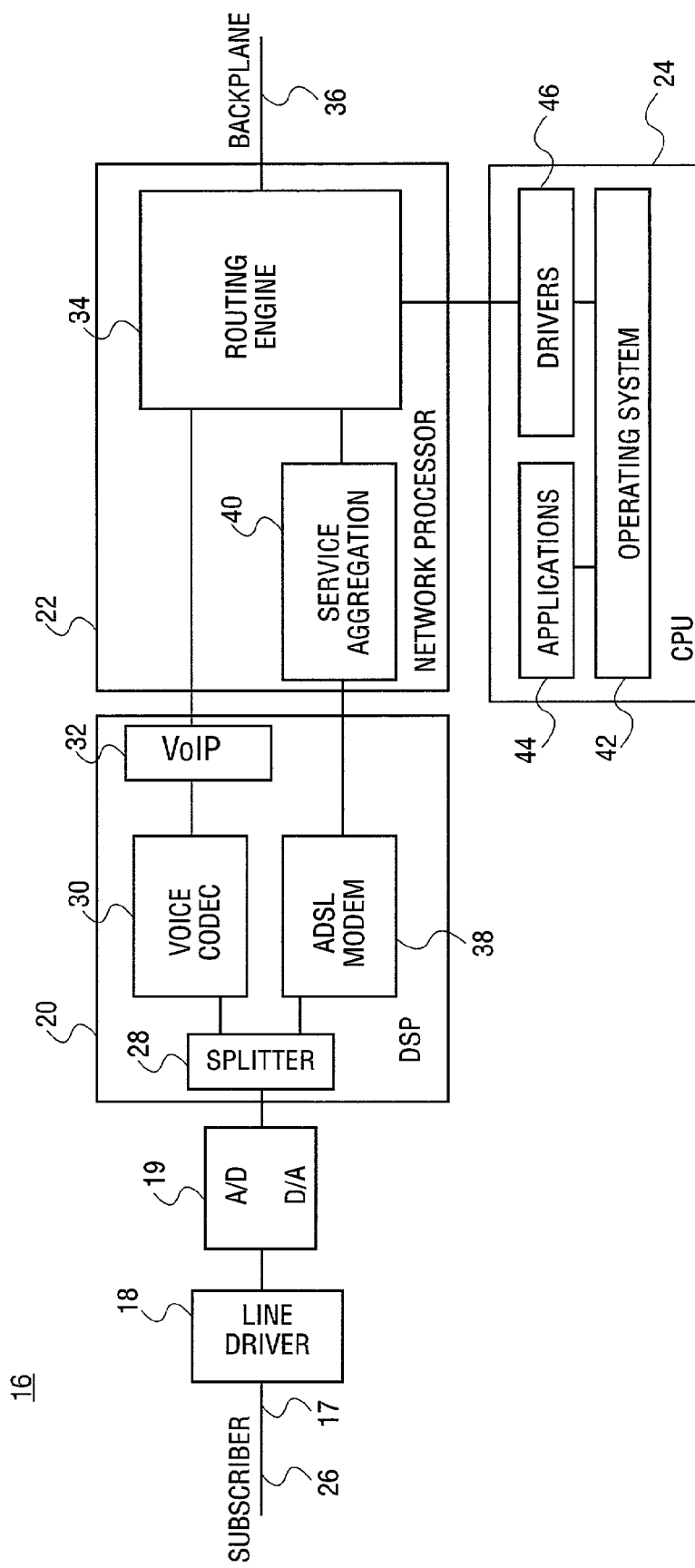
FIG. 2 is a diagram of an embodiment that receives voice traffic and data traffic from a subscriber and prepares the data from both the voice traffic and the data traffic to be packetized and routed over a network.

FIG. 2 shows a logical diagram of one embodiment, wherein line card 16 receives voice data for telephone service and data for ADSL service. Line card 16 comprises a port 17 to interface with subscriber line 26, line driver 18, analog to digital ("A/D") converter 19, digital signal processor ("DSP") 20, network processor 22, and central processing unit ("CPU") 24. Upon receiving data that conforms to multiple protocols via port 17, line card 16 converts analog signals to digital with A/D converter 19. When sending data to a subscriber on subscriber line 26, A/D converter 19 may be used, if necessary, to convert digital signals to analog ("D/A").

The received data is passed through to frequency band splitter 28 of DSP 20. Frequency band splitter 28 forwards telephone service traffic that corresponds to a telephone service frequency band to voice coder/decoder ("CODEC") 30 for digitization. Data that corresponds to an ADSL service frequency band is forwarded to ADSL modem 38. Although modem 38 is shown as an ADSL modem, modem 38 can be of any appropriate type that will accommodate the type of DSL service being provided.

The telephone service data is packetized in accordance with IP protocol by conversion unit 32. The packets from conversion unit 32 are sent to routing engine 34 of network processor 22. Data routed through ADSL modem 38 is reassembled from ATM cells into IP packets. Aggregation unit 40 of network processor 22 aggregates the IP packets and forwards them to routing engine 34. Routing engine 34 of network processor 22 handles queuing, traffic management, scheduling, and switching the packetized data in order to send the packets to their respective network destinations via line 36, which is coupled to a backplane that is coupled to Local Loop 52 of FIG. 3.

CPU 24 is coupled to network processor 22 and utilizes operating system 42 to run applications 44 and drivers 46. Among others, applications 44 include a service creation application, a network management application, a security application, a content caching application, and a telephony control application.

Figure 3:
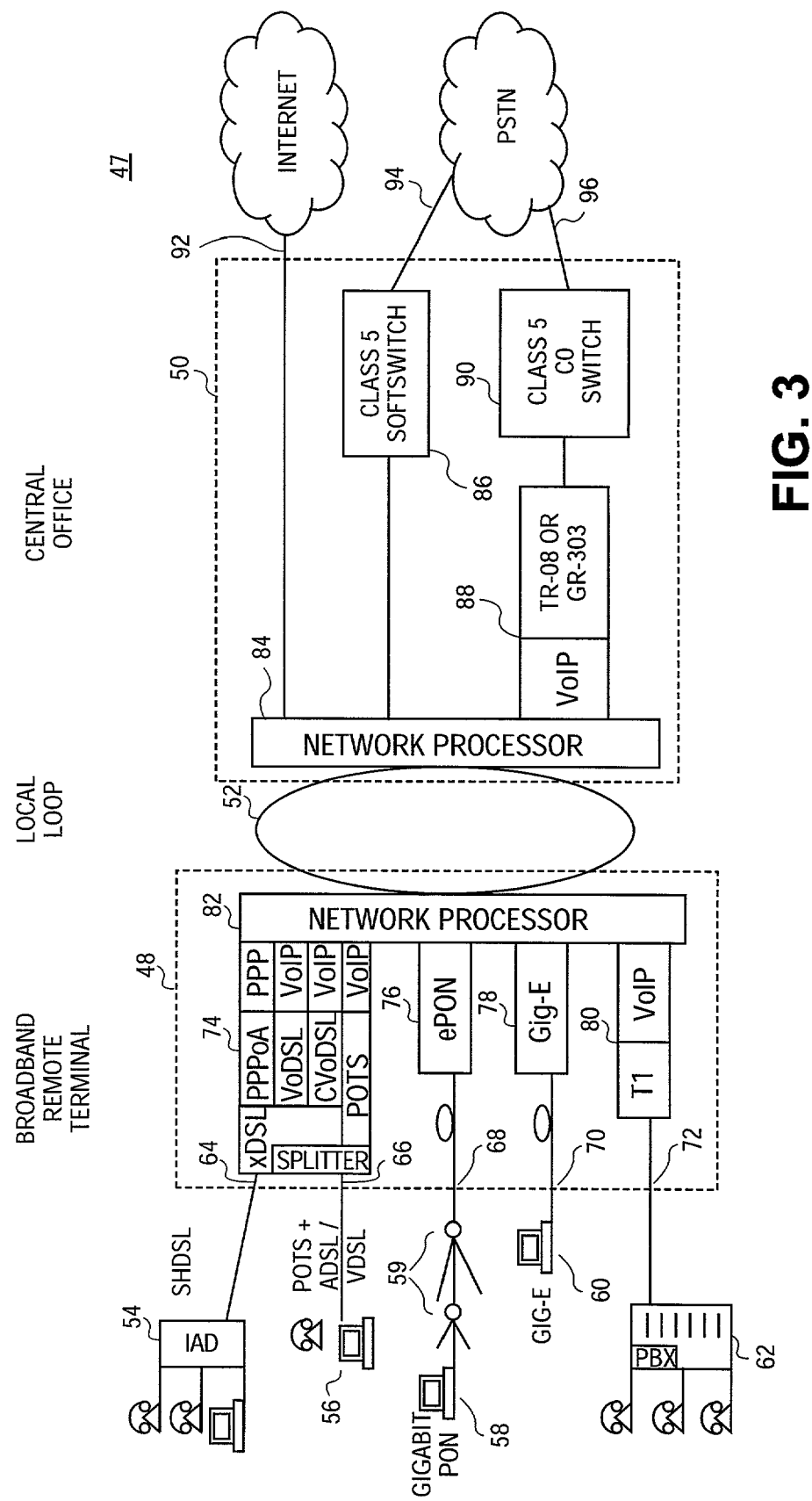
FIG. 3 is a diagram of a Remote Terminal of a loop carrier system connected to a Central Office. The embodiment shown in FIG. 2 is included in the Remote Terminal of FIG. 3.

FIG. 3 is a logical diagram of a portion of telecommunications network 47. The portion of telecommunications network 47 shown contains Remote Terminal 48, Local Loop 52 to which Remote Terminal 48 is coupled, and Central Office 50, also coupled to Local Loop 52. Remote Terminal 48 may be coupled to Central Office 50 via fiber optic material, copper wire, coaxial cable, or a wireless connection.

Remote Terminal 48 has a multiplexer (not shown) to terminate network subscriber connections. In various embodiments, ports 64, 66, 68, 70, and 72 are coupled to the same multiplexer (e.g., interface). In addition, depending on the type of data received on ports 64, 66, 68, 70, and 72, the data may be combined and received on a single communication link (e.g., transport medium) and separated as necessary within Remote Terminal 48.

Port 64 receives data from Integrated Access Device ("IAD") 54 that provides SHDSL service. IAD 54 is used to aggregate diverse traffic types such as voice and data from a subscriber over a single line. IAD 54 converts analog voice traffic to digital. The data traffic received from IAD 54 at port 64 is routed to an xDSL interface of packetization unit 74 of Remote Terminal 48. As used herein, "xDSL" is a generic designator for all types of DSL service.

Content received by the xDSL interface can take various forms, including ATM segmented Frame Relay or IP packets (e.g., data that conforms to the Internet Engineering Task Force's Request for Comments 1496 ("RFC1496") interworking standard), Point-to-Point Protocol over ATM ("PPPoA"), Voice over DSL ("VoDSL"), and others.RFC1496 type data is reassembled into native packets and may either be transported to its destination or terminated locally as a router interface.

PPPOA is reassembled to native Point-to-Point Protocol ("PPP"), where it could either be transported to its destination, or it could be terminated locally as a router interface.

If the data traffic received by the xDSL interface is VODSL traffic, packetization unit 74 converts the VoDSL traffic to Voice over IP ("VoIP") traffic. Similarly, Channelized Voice over Digital Subscriber Line ("CVoDSL") traffic received by the XDSL interface is converted to VOIP traffic by packetization unit 74. CVODSL is a relatively new development that allocates TDM bandwidth over a DSL.

As referred to in FIG. 2, Remote Terminal 48 may receive telephone service traffic that corresponds to a telephone service frequency band and ADSL/Very High Bit Rate Digital Subscriber Line ("VDSL") traffic that corresponds to an xDSL frequency band at port 66 from subscriber connection 56. Frequency band splitter 28 and ADSL modem 38 from FIG. 2 are also included in packetization unit 74 and separate the telephone service traffic and the DSL traffic by frequency and packetize the data as discussed above. The telephone service traffic is sent to VoIP conversion unit 32 of FIG. 2, also included in packetization unit 74 of Remote Terminal 48 of FIG. 3. Network Processor 22 of FIG. 2 is at least part of Network Processor 82 of FIG. 3.

Port 68 of Remote Terminal 48 receives data from Gigabit Passive Optical Network ("PON") device 58. Optical splitters 59 collect data from other Gigabit PON devices and terminate the PON connection at port 68. The data received from Gigabit PON device 58 is received as native packets. Therefore, no packetization is required beyond that conducted at Ethernet-based Passive Optical Network ("ePON") block 76 to ensure that the packets conform to the IP protocol.

Device 60 sends data to Remote Terminal 48 via port 70. Device 60 transmits data in accordance with the Gigabit Ethernet ("Gig-E") standard. Ethernet packets are native packets that do not require packetization beyond ensuring that the packets conform to IP standards at Gig-E block 78.

Finally, port 72 receives voice data from Public Branch Exchange ("PBX") 62. A PBX usually connects a large entity such as a corporation, hotel, or hospital to a phone network via a T1 connection. A T1 connection is a type of T-Carrier system, which uses TDM to combine and transmit Pulse Code Modulated streams created for each of many telephone conversations. Conversion unit 80 transforms the voice data received in T1 format into VOIP packets that can be routed along with all the other IP packets via Network Processor 82 over Local Loop 52.

Upon receipt of the IP packets by Network Processor 84 of Central Office 50, the packets are routed to their appropriate destination by Network Processor 84. For example, packets bounds for the Internet are sent out of Central Office 50 via line 92.

If appropriate, the data may be routed from Network Processor 84 through voice control device 86 to a Public Switched Telephone Network ("PSTN") via line 94. In the embodiment shown in FIG. 3, voice control device 86 is a Class 5 softswitch, which is a specific type of voice control device. A voice control device includes software that resides on a server or other network element that separates call control functions of a phone call from the media gateways that carry the phone call. Built on open architectures, voice control devices are far less expensive than circuit switches and are much more flexible.

Finally, the data may be routed from Network Processor 84 through conversion unit 88 that includes either TR-08 or GR-303, both of which are interfaces between a local loop and a switch (e.g., Class 5 Central Office Switch). Conversion unit 88 removes the voice data from the VOIP packets and routes the voice data to switch 90, which forwards the voice data to the PSTN via line 96.

It is to be understood that even though numerous characteristics and advantages of various embodiments have been set forth in the foregoing description, together with details of structure and function, this disclosure is illustrative only. Changes may be made in detail, especially matters of structure and management of parts, without departing from the scope of the various embodiments as expressed by the broad general meaning of the terms of the appended claims.

We claim:

1. An apparatus comprising:
   at least one port to receive data that conforms to multiple protocols;
   a signal processing unit coupled to at least one of the ports, the signal processing unit to convert the data into packets that conform to an internet protocol of a single layer of an Open System Interconnection Model;
   a network processor coupled to the signal processing unit, the network processor having a routing engine to route the packets across a network by handling queuing, traffic management, scheduling, and switching; and
   a central processing unit coupled to the network processor, the central processing unit to run application programs, wherein the application programs comprise a service creation application, a network management application, a security application, a content caching application, and a telephony voice control application, wherein the signal processing unit, network processor, and central processing unit are located in a broadband remote terminal to provide for optimal reallocation of bandwidth as network traffic changes based on sending from the broadband remote terminal packets across a local loop to a central office using the internet protocol of the single layer of the Open System Interconnection Model.

2. The apparatus of claim 1, wherein the single layer is Layer 3.

3. The apparatus of claim 1, wherein the data originally conforms to at least one of an Asynchronous Transfer Mode protocol, a Time Division Multiplexing protocol, an Ethernet protocol, and a native packet format.

4. The apparatus of claim 1, wherein the signal processing unit comprises:
   a digital signal processor having a frequency band splitter;
   a voice coder/decoder coupled to the frequency band splitter; and
   a digital subscriber line modem coupled to the frequency band splitter.

5. A remote terminal to be coupled to a telecommunications network, the remote terminal comprising:
   a multiplexer to terminate a network subscriber connection;
   at least one port coupled to the multiplexer, the port to receive data that conforms to multiple protocols;
   a signal processing unit coupled to at least one of the ports, the signal processing unit to convert the data into packets that conform to an internet protocol of a single layer of an Open System Interconnection Model; a network processor coupled to the signal processing unit, the network processor having a routing engine to route the packets across a network by handling queuing, traffic management, scheduling, and switching; and
   a central processing unit coupled to the network processor, the central processing unit to run application programs, wherein the application programs comprise a service creation application, a network management application, a security application, a content caching application, and a telephony voice control application, wherein the signal processing unit, network processor, and central processing unit are located in the remote terminal to provide for optimal reallocation of bandwidth as network traffic changes based on sending from the remote terminal packets across a local loop to a central office using the internet protocol of the single layer of the Open System Interconnection Model.

6. The remote terminal of claim 5, wherein the single layer is Layer 3.

7. The remote terminal of claim 5, wherein the data originally conforms to at least one of an Asynchronous Transfer Mode protocol, a Time Division Multiplexing protocol, an Ethernet protocol, and a native packet format.

8. The remote terminal of claim 5, wherein the signal processing unit comprises:
   a digital signal processor having a frequency band splitter;
   a voice coder/decoder coupled to the frequency band splitter; and
   a digital subscriber line modem coupled to the frequency band splitter.

9. A telecommunications network comprising:
   a central office; and
   a broadband remote terminal in communication with the central office, the broadband remote terminal comprising
   a multiplexer to terminate a network subscriber connection,
   at least one port coupled to the multiplexer, the port to receive data that conforms to multiple protocols, a signal processing unit coupled to at least one of the ports, the signal processing unit to convert the data into packets that conform to an internet protocol of a single layer of an Open System Interconnection Model, a network processor coupled to the signal processing unit, the network processor having a routing engine to route the packets across a network by handling queuing, traffic management, scheduling, and switching, and a central processing unit coupled to the network processor, the central processing unit to run application programs, wherein the application programs comprise a service creation application, a network management application, a security application, a content caching application, and a telephony voice control application, wherein the signal processing unit, network processor, and central processing unit are located in the broadband remote terminal to provide for optimal reallocation of bandwidth as network traffic changes based on sending from the broadband remote terminal packets across a local loop to the central office using the internet protocol of the single layer of the Open System Interconnection Model.

10. The telecommunications network of claim 9, wherein the single layer is Layer 3.

11. The telecommunications network of claim 9, wherein the data originally conforms to at least one of an Asynchronous Transfer Mode protocol, a Time Division Multiplexing protocol, an Ethernet protocol, and a native packet format.

12. The telecommunications network of claim 9, wherein the signal processing unit comprises:
a digital signal processor having a frequency band splitter;
a voice coder/decoder coupled to the frequency band splitter; and
a digital subscriber line modem coupled to the frequency band splitter.

13. A method comprising:
receiving data from a network subscriber, wherein the data conforms to multiple protocols;
converting the data into packets that conform to an internet protocol of a single layer of an Open System Interconnection Model;
propagating the packets across a network by having a routing engine within a network processor that handles queuing, traffic management, scheduling, and switching; and
executing application programs with a central processing unit that is coupled to the network processor, wherein the application programs comprise a service creation application, a network management application, a security application, a content caching application, and a telephony voice control application, wherein the signal processing unit, network processor, and central processing unit are located in a broadband remote terminal to provide for optimal reallocation of bandwidth as network traffic changes based on sending from the broadband remote terminal packets across a local loop to a central office using the internet protocol of the single layer of the Open System Interconnection Model.

14. The method of claim 13, wherein the single layer comprises: Layer 3.

15. The method of claim 14, wherein converting comprises:
creating packets that conform to an Internet Protocol standard.

16. The method of claim 13, further comprising:
prioritizing packet propagation based on packet type.

17. The method of claim 16, wherein voice data packets are given priority over non-voice data packets.

18. The method of claim 13, further comprising:
reallocating bandwidth based on network requirements.

19. A method comprising:
receiving a first data stream having data formatted according to a first communications protocol;
receiving a second data stream having data formatted according to a second communications protocol;
converting the first and second data streams into a third data stream having data formatted according to a third communications protocol;
transmitting the third data stream by having a routing engine within a network processor that handles queuing, traffic management, scheduling, and switching; and
executing application programs with a central processing unit that is coupled to the network processor, wherein the application programs comprise a service creation application, a network management application, a security application, a content caching application, and a telephony voice control application, wherein the signal processing unit, network processor, and central processing unit are located in a broadband remote terminal to provide for optimal reallocation of bandwidth as network traffic changes based on sending from the broadband remote terminal packets across a local loop to a central office using the third communications protocol.

20. The method of claim 19, wherein the third communications protocol comprises:
a single protocol of Layer 3 of an Open System Interconnection Model.

21. The method of claim 19, wherein receiving the first and second data streams comprises:
receiving the first and second data streams via a same interface.

22. The method of claim 19, wherein receiving the first and second data streams comprises:
receiving the first and second data streams via a same communication link.

* * * * *